(12) United States Patent
Oh

(10) Patent No.: US 7,821,769 B2
(45) Date of Patent: Oct. 26, 2010

(54) METAL CAPACITOR AND MANUFACTURING METHOD THEREOF

(76) Inventor: Young Joo Oh, #1401 Villpolaris, 49-5 Jamwon-dong, Seocho-gu, Seoul 137-906 (KR)

( * ) Notice: Subject to any disclaimer, the term of this patent is extended or adjusted under 35 U.S.C. 154(b) by 0 days.

(21) Appl. No.: 12/588,738

(22) Filed: Oct. 27, 2009

(65) Prior Publication Data

US 2010/0046145 A1    Feb. 25, 2010

Related U.S. Application Data

(62) Division of application No. 12/155,780, filed on Jun. 10, 2008, now Pat. No. 7,626,802.

(30) Foreign Application Priority Data

Oct. 19, 2007  (KR)  ............... 10-2007-0105716
May 23, 2008  (KR)  ............... 10-2008-0048003

(51) Int. Cl.
*H01G 4/30* (2006.01)

(52) U.S. Cl. ............... 361/301.4; 361/301.2; 361/311; 361/303; 361/313; 361/523

(58) Field of Classification Search ............ 361/301.4, 361/301.1, 306.1, 306.3, 308.1, 311–313, 361/303–305, 321.1, 321.2, 523–528
See application file for complete search history.

(56) References Cited

U.S. PATENT DOCUMENTS

| | | | |
|---|---|---|---|
| 6,166,899 A | 12/2000 | Tamamitsu | |
| 6,178,082 B1* | 1/2001 | Farooq et al. | 361/303 |
| 6,333,857 B1* | 12/2001 | Kanbe et al. | 361/792 |
| 6,549,395 B1* | 4/2003 | Naito et al. | 361/306.1 |
| 6,577,490 B2* | 6/2003 | Ogawa et al. | 361/306.1 |
| 6,795,295 B2* | 9/2004 | Murakami et al. | 361/306.3 |
| 7,002,075 B2* | 2/2006 | Kambe et al. | 174/565 |
| 7,312,975 B2* | 12/2007 | Togashi et al. | 361/321.1 |

* cited by examiner

*Primary Examiner*—Nguyen T Ha
(74) *Attorney, Agent, or Firm*—Rosenberg, Klein & Lee

(57) ABSTRACT

A metal capacitor in which an electric conductivity is significantly improved by applying a metal material for an electrolyte and a manufacturing method thereof is provided. The capacitor includes: a terminal increase-type metal member comprising a groove forming portion; a metal oxide layer being formed on the terminal increase-type metal member; an insulating layer being formed on the terminal increase-type metal member; a plurality of main electrode layers being formed in a groove forming portion; a plurality of conductive connecting layers being formed on the plurality of main electrode layers and the insulating layer; a first lead terminal being selectively connected to the first and the second electrode withdrawing portions of the terminal increase-type metal member; a second lead terminal being connected to the main electrode layer of the terminal increase-type metal member; and a sealing member sealing the terminal increase-type metal member connected to the first and the second lead terminals to externally expose the first and the second lead terminals.

4 Claims, 6 Drawing Sheets

METAL CAPACITOR AND MANUFACTURING METHOD THEREOF

RELATED APPLICATIONS

This application is a Divisional patent application of application Ser. No. 12/155,780, filed on 10 Jun. 2008 now U.S. Pat. No. 7,626,802. The entire disclosure of the prior application Ser. No. 12/155,780, from which an oath or declaration is supplied, is considered a part of the disclosure of the accompanying Divisional application and is hereby incorporated by reference.

BACKGROUND

1. Field

The present invention relates to a metal capacitor and a manufacturing method thereof, and more particularly, to a metal capacitor in which an electric conductivity is significantly improved by applying a metal material for an electrolyte and a manufacturing method thereof.

2. Background

An aluminum electrolytic capacitor is used to smooth a power output from a power circuit to be a predetermined value, or is used as a low frequency bypass. Hereinafter, a method of manufacturing the aluminum electrolytic capacitor will be briefly described.

An etching process of etching the surface of an aluminum foil is performed to enlarge a surface area of the aluminum foil and thereby increase an electric capacity. When the etching process is completed, a forming process of forming a dielectric substance on the aluminum foil is performed. When cathode and anode aluminum foils are manufactured through the etching process and the forming process, a slitting process of cutting the manufactured aluminum foil and a separator by as long as a desired width based on the length of a product is performed. When the slitting process is completed, a stitching process of stitching an aluminum lead patch, which is a lead terminal, to the aluminum foil is performed.

When the slitting of the aluminum foil and the separator is completed, a winding process of disposing the separator between the anode aluminum foil and the cathode aluminum foil, and then winding the separator and the aluminum foils in a cylindrical shape and attaching a tape thereto, so as to not be unwounded. When the winding process is completed, an impregnation process of inserting the wound device into an aluminum case and injecting an electrolyte is performed. When the injecting of the electrolyte is completed, a curing process of sealing the aluminum case using a sealing material is performed. When the curling process is completed, an aging process of restoring a damage to the dielectric substance is performed. Through this, the assembly of the aluminum electrolytic capacitor is completed.

Due to advancement in digitalization and slimness of current electronic devices, there is a need for a capacitor having a low impedance in a high frequency. In order to improve the conventional aluminum electrolytic capacitor manufactured as above, a functional layer-type aluminum solid capacitor or a functional tantalum capacitor is used. However, there are problems as follow.

Since the conventional functional layer-type aluminum solid capacitor or the functional tantalum capacitor uses conductive polymer compounds such as polypyrrole or polythiophene, for electrolyte, there are some constraints on the thermal resistance and the withstanding voltage. Also, since a negative electrode is formed by spraying paste such as graphite in turn, the capacitor becomes thicker. Accordingly, there is some constraint on the number of layers and a contact resistance occurs between layers to thereby deteriorate the impedance.

SUMMARY OF THE INVENTION

The present invention is conceived to solve the above-described problems and thus provides a metal capacitor in which an electric conductivity is improved by about 10,000 to 1,000,000 folds by applying a metal material for an electrolyte, in comparison to when using a conventional electrolyte or an organic semiconductor, a multi-layer metal capacitor using the metal capacitor, and a manufacturing method thereof.

The present invention also provides a metal capacitor which can improve a miniature, a low equivalent series resistance (ESR), a reduction in a ripple pyrexia, a long life, a heat-resistant stability, non-fuming, non-firing, and environment by using a metal material for an electrolyte, and a manufacturing method thereof.

According to an aspect of the present invention, there is provided: a metal capacitor including: a terminal increase-type metal member including a terminal increase-type metal member comprising a groove forming portion; a metal oxide layer being formed on the terminal increase-type metal member; an insulating layer being formed on the terminal increase-type metal member; a plurality of main electrode layers being formed in a groove forming portion; a plurality of conductive connecting layers being formed on the plurality of main electrode layers and the insulating layer; a first lead terminal being selectively connected to the first and the second electrode withdrawing portions of the terminal increase-type metal member; a second lead terminal being connected to the main electrode layer of the terminal increase-type metal member; and a sealing member sealing the terminal increase-type metal member connected to the first and the second lead terminals to externally expose the first and the second lead terminals.

According to another aspect of the present invention, there is provided a method of forming a metal capacitor, forming a pattern or grooves using a printing ink or physical scratch, or scratches using a nano needle; forming a groove forming portion that includes a plurality of grooves on both surfaces to thereby form a terminal increase-type metal member integrally formed with first and second electrode withdrawing portions by using a direct current (DC) etching method; forming a metal oxide layer on the terminal increase-type metal member by using an anodizing method, when the groove forming portion, and the first and the second electrode withdrawing portions are integrally formed on the terminal increase-type metal member; forming an insulating layer on the plurality of main electrode layers and the terminal increase-type metal member to externally expose the first and the second electrode withdrawing portions of the terminal increase-type metal member by using a chemical vapor deposition (CVD) method; forming a plurality of seed electrode layers in the groove forming portion to be penetrated into the metal oxide layer by using an electroless plating or an electroplating; forming a plurality of main electrode layers to fill in the plurality of grooves formed on the groove forming portion of the metal member by using the plurality of seed electrode layers as media; forming a conductive connecting layer on the plurality of main electrode layers and the insulating layer to make the first and the second electrode withdrawing portions of the terminal increase-type metal member orthogonal to each other and connect the plurality of main electrode layers; connecting the second lead terminal to the main electrode layer of the terminal increase-type metal member and connecting the first lead terminals to the first and the second electrode withdrawing portions of the metal member; and sealing the terminal increase-type metal member with a sealing member to externally expose the first and the second lead terminals.

BRIEF DESCRIPTION OF THE DRAWINGS

The embodiments will be described in detail with reference to the following drawings in which like reference numerals refer to like elements wherein.

DETAILED DESCRIPTION

First Embodiment

Hereinafter, a configuration of a metal capacitor according to a first embodiment of the present invention will be described with reference to FIGS. 1 through 3.

Figure 1:
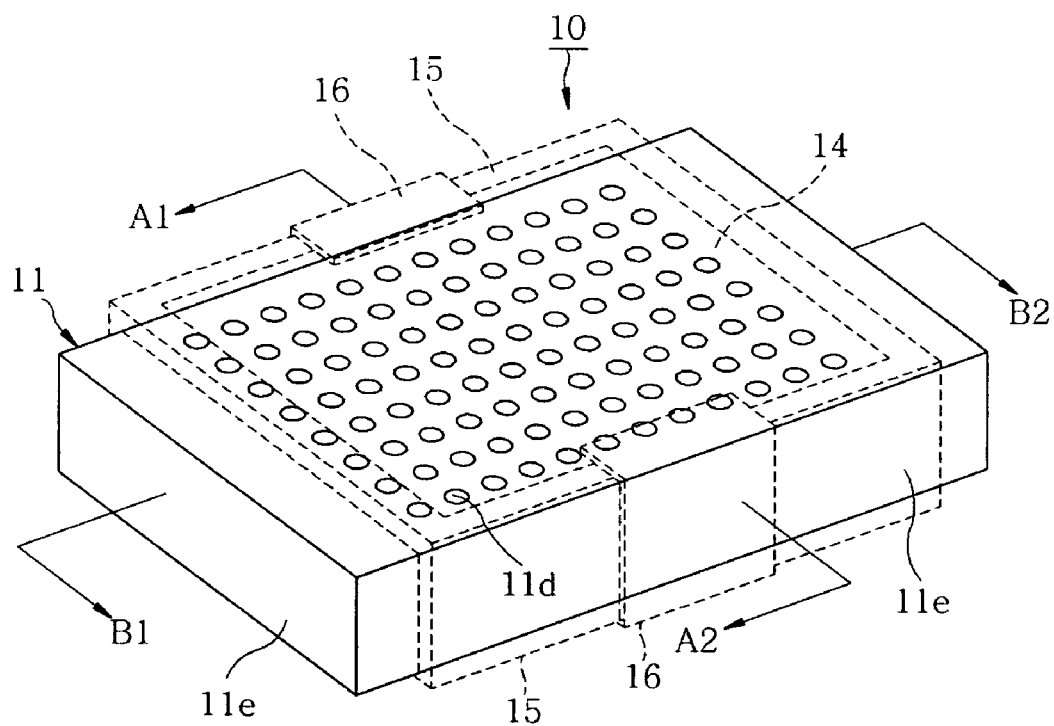
FIG. 1 is a perspective view of a metal capacitor according to a first embodiment of the present invention.
Figure 2:
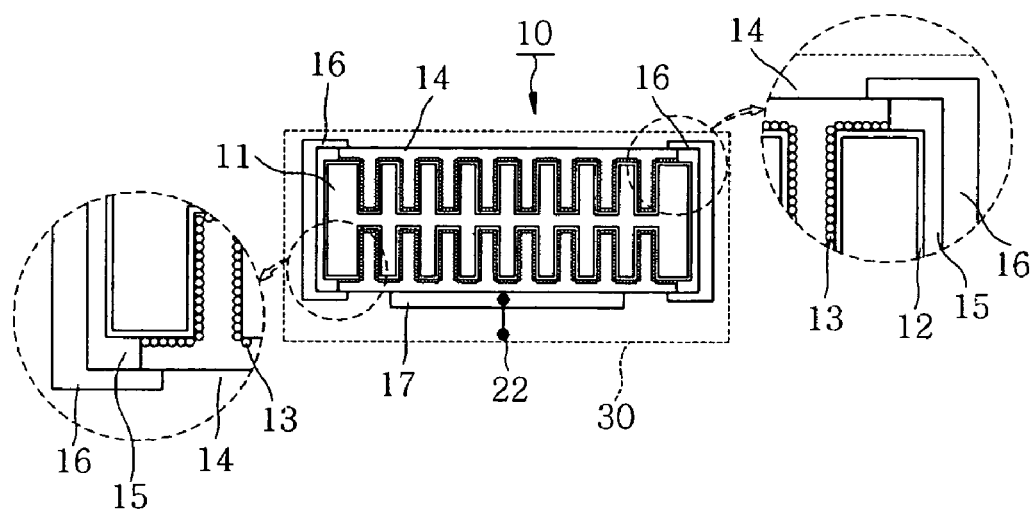
FIG. 2 is a cross-sectional view cut along A1-A2 line of the metal capacitor shown in FIG. 1.
Figure 3:
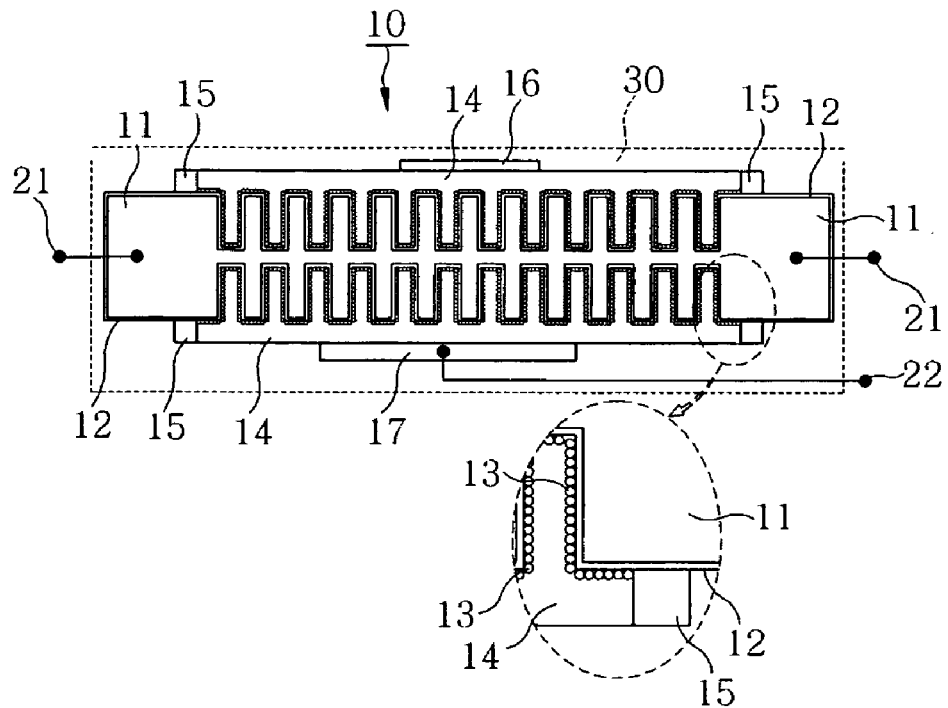
FIG. 3 is a cross-sectional view cut along B1-B2 of the metal capacitor shown in FIG. 1.

FIG. 1 is a perspective view of a metal capacitor 10 according to the first embodiment of the present invention, FIG. 2 is a cross-sectional view cut along A1-A2 line of the metal capacitor shown in FIG. 1, and FIG. 3 is a cross-sectional view cut along B1-B2 of the metal capacitor shown in FIG. 1. As shown in the figures, the metal capacitor 10 according to the first embodiment of the present invention includes a terminal increase-type metal ember 11, a metal oxide layer 12, a plurality of seed electrode layers 13, a plurality of main electrode layers 14, an insulating layer 15, a plurality of conductive conducting layers 16, a first lead terminal 21, a second lead terminal 22, and a sealing member 30. The plurality of seed electrode layers 13 may be removed and not be applied depending on requirement of the user.

Hereinafter, the configuration thereof will be sequentially described.

Figure 4A:
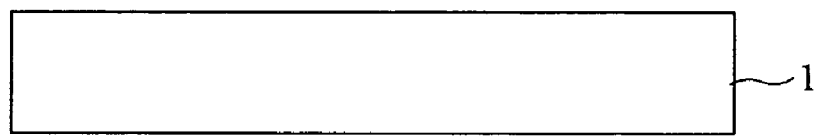
FIGS. 4A through 4G are cross-sectional views illustrating a method of manufacturing the metal capacitor according to the first embodiment of the present invention.
Figure 4B:
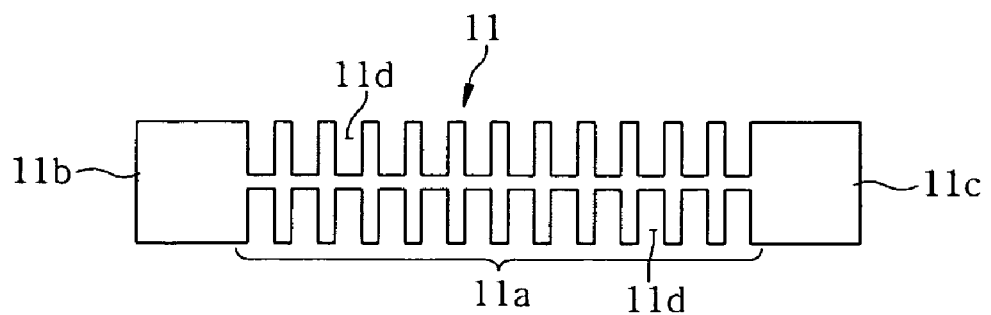

As shown in FIG. 4B, the terminal increase-type metal member 11 includes a groove forming portion 11a that is provided by arranging a plurality of grooves 11d on its both surfaces, and first and second electrode withdrawing portions 11b and 11c formed on one end and another end of the groove forming portion 11a. The terminal increase-type metal member 11 may connect three terminal electrodes by increasing a number of terminals. Each of a plurality of grooves 11d that is formed in the groove forming portion 11a is formed in the shape of a circle or a polygon. The terminal increase-type metal member 11 where the groove forming portion 11a, and the electrode withdrawing portion 11b and 11c are integrally formed uses any one of aluminum (Al), niobium (Nb), tantalum (Ta), titanium (Ti), and zirconium (Zr).

The metal oxide layer 12 is formed on the metal member 11, and uses any one of alumina ($Al_2O_3$), niobium monoxide (NbO), niobium pentoxide (Nb2O5), tantalum pentoxide (Ta2O5), titanium dioxide (TiO2), and zirconium dioxide (ZrO2). The metal oxide layer 12 is formed on both surface (top and bottom) and a side 11e of the terminal increase-type metal member 11.

The insulating layer 15 is formed on the terminal increase-type metal member 11 along the side 11e of the terminal increase-type metal member 11 so that the first and the second electrode withdrawing portion 11b and 11c of the terminal increase-type metal member may be externally exposed. The insulating layer 15 can be formed after forming a plurality of main electrode layers 14. At this time, the insulating layer 15 is formed on the plurality of main electrode layers 14 and/or the plurality of the main electrode layers 14.

The insulating layer 15 is formed on all the remaining side 11e of the terminal increase-type metal member 11, excluding the surface where the first and the second electrode withdrawing portions 11b and 11c of the terminal increase-type metal member 11 is formed.

The plurality of seed electrode layers 13 is formed on the metal oxide layer 12s that are formed on both surfaces of the groove forming portion 11a of the terminal increase-type metal member 11. The plurality of main electrode layers 14 is formed on the plurality of seed electrode layers formed on both surfaces of the groove forming portion 11a to fill in the plurality of grooves 11d formed on the groove forming portion 11a of the metal member 11.

The plurality of conductive connecting layers 16 is formed on the plurality of main electrode layers 14 and the insulating layer 15 to make the first and the second electrode withdrawing portion 11b and 11c of the terminal increase-type metal member 11 orthogonal to each other and connect the plurality of main electrode layers 14. In order to connect the plurality of main electrode layers 14, the plurality of conductive connecting layers 16 is formed on the plurality of main electrode layers 16 and the insulating layer 15 to make the first and the second electrode withdrawing portions 11b and 11c orthogonal to each other. The first and the second electrode withdrawing portions 11b and 11c face each other. Each of the plurality of main electrode layers 14 that is electrically connected by the conductive connecting layer 16, the seed electrode layer 13, and the conductive connecting layer 16 uses any one of aluminum (Al), copper (Cu), zinc (Zn), silver (Ag), nickel (Ni), tin (Sn), indium (In), palladium (Pd), platinum (Pt), cobalt (Co), ruthenium (Ru), and gold (Au).

The first lead terminal 21 is selectively connected to the first and the second electrode withdrawing portions 11b and 11c of the terminal increase-type metal member 11. For example, the first lead terminal 21 may be connected to the first electrode withdrawing portion 11b of the terminal increase-type metal member 11 or to the second electrode withdrawing portion 11c of the terminal increase-type metal member 11. The second lead terminal is connected to the main electrode layer 14 of the terminal increase-type metal member 11. Through this, the non-polar metal capacitor 10 is constructed.

In order to improve the adhesiveness of the second lead terminal 22 connected to one of the main electrode layers 14, a conductive adhesive layer 17 is further provided. The conductive adhesive layer 17 is formed on the main electrode layer 14 connected to the second lead terminal 22 among the plurality of main electrode layers 14. The sealing member 30 seals the terminal increase-type metal member 11 connected to the first and the second lead terminals 21 and 22, so that the first and the second lead terminals 21 and 22 may be externally exposed. The sealing member 30 uses molding material or a cover member with an empty inside.

Hereinafter, a manufacturing method of the metal capacitor 10 according to the first embodiment will be described with reference to the accompanying drawings.

When a member 1 such as film, foil, etc., of a metal material is provided as shown in FIGS. 4A and 4B, the manufacturing method of the metal capacitor 10 according to the first embodiment of the present invention forms a pattern (not shown) using a printing ink or physical scratch, or scratches using a nano needle. The manufacturing method forms the groove forming portion 11a where the plurality of grooves 11d is arranged on both surfaces of the member 1 using a direct current (DC) etching and thereby forms the terminal increase-type metal member 11 integrally formed with the first and the second electrode withdrawing portions 11b and 11c on one end and the other end of the groove forming portion 11a.

The DC etching performs a pre-processing process for the member 1 in an aqueous solution with about 1% of phosphoric acid in the temperature of about 50° C. during about one minute, and performs first etching in the mixture of sulfuric acid, phosphoric acid, aluminum, etc. in the temperature of about 70° C. and 90° C. during about two minutes. In this case, the current density is about 100 mA/cm$^2$ through 400 mA/cm$^2$. The DC etching performs second etching in the mixture of nitric acid, phosphoric acid, aluminum, etc., in the temperature of about 80° C. during ten minutes. In this case, the current density is about 10 mA/cm$^2$ through 100 mA/cm$^2$. When the first etching and the second etching are completed, chemical cleaning is performed in the solution of nitric acid 30 g through 70 g/l in the temperature of about 60° C. through 70° C. during about ten minutes. In case of the etching, etching structures are very simple and uniform and thus applies completely plating up to an inner end of the grooves.

The first and the second electrode withdrawing portions 11b and 11c formed on the terminal increase-type metal member 11 are constructed to make the metal capacitor have three terminals when constructing a polar metal capacitor by selectively connecting the first lead terminal 21, and may be constructed to make the metal capacitor have two terminals even when the metal capacitor is non-polar. The plurality of grooves 11d formed on the groove forming portion 11a of the terminal increase-type metal member 11 is formed in the shape of a circle or a polygon and has a diameter of about 1 μm through 100 μm. When the thickness of the metal member 11 is 1 μm, the depth of the metal member 10 is formed to be less than about 0.5 μm.

Figure 4C:
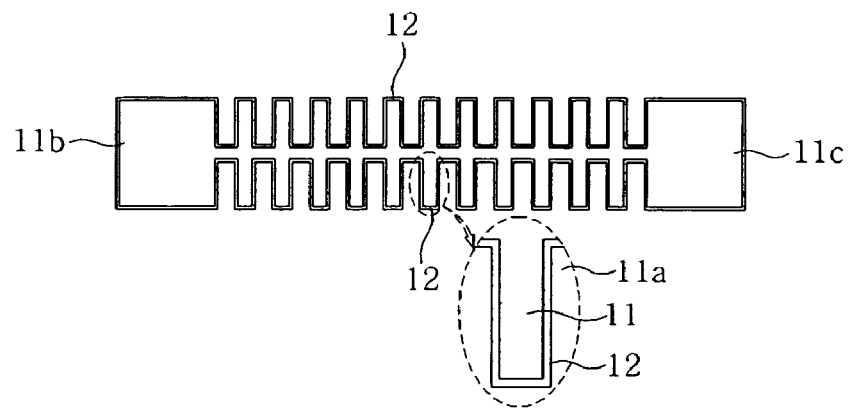

As shown in FIG. 4C, when the groove forming portion 11a, and the first and the second electrode withdrawing portions 11b and 11c are integrally formed on the terminal increase-type metal member 11, the manufacturing method performs a forming process of forming the metal oxide layer 12 on the metal member 11 by using an anodizing method.

The anodizing method initially performs a boiling process in the temperature of about 80° C. through 100° C. during one through fifteen minutes in a deionized water, proceeds first oxidation in an aqueous solution of boric acid and boric acid-ammonium with 120 through 150 voltages, and proceeds a plurality of, two or three times of oxidations with changing the concentration and the voltage of the aqueous solution. The anodizing method performs a thermal treatment in the predetermined temperature, for example, in the temperature of 400° C. through 600° C. to perform a reforming process. Also, the anodizing method proceeds a by-product treatment in order to disposal and remove the by-product generated in the reforming process. Also, the anodizing method repeats the reforming process and the thermal treatment and proceeds a predetermined cleaning process in order to clean boric acid or phosphoric acid.

Figure 4D:
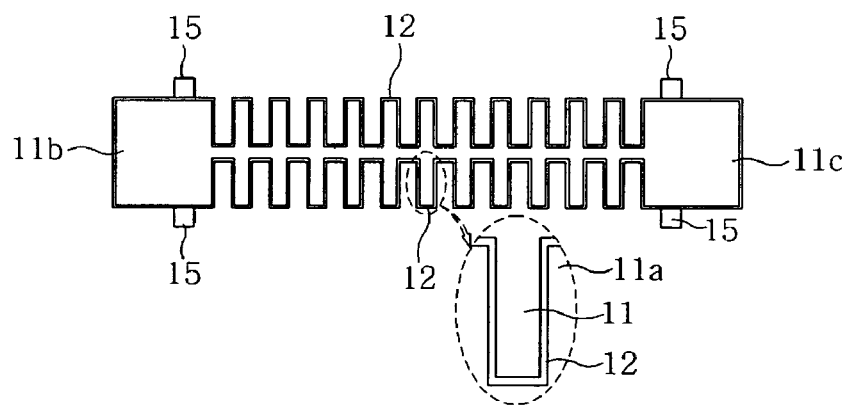

As shown in FIG. 4D, the manufacturing method forms a non-through type metal member 10a by forming the insulating layer 15 on the plurality of main electrode layers 14 and/or the side 11e of the terminal increase-type metal member 11 along the side 11e of the metal member 11 by using a CVD (Chemical Vapor Deposition) method, so that the first and the second electrode withdrawing portion 11b and 11c of the terminal increase-type metal member 11 may be externally exposed. The insulating layer 15 is formed using an insulating tape or a resin material. Although the CVD is used herein, it is possible to apply any one of a dipping process using an insulating resin or insulating ink, a spray process using ink-jet printing or screen printing, and a stamping process.

Figure 4E:
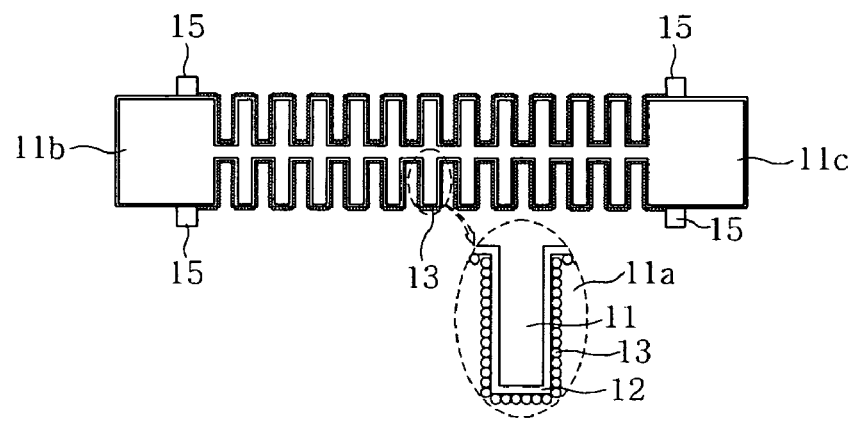

As shown in FIG. 4E, the manufacturing method forms the plurality of seed electrode layers on the metal oxide layer 12 that is formed in the groove forming portion 11a to be penetrated into the metal oxide layer 12 by using an electroless plating or an electroplating.

The manufacturing method deposits a predetermined amount of palladium sulfate aqueous solution as an activator during 10 through 300 seconds in the seed electrode layer forming process and removes the activator of surface thereof by dipping and cleaning during one through thirty seconds at the normal temperature. Nickel phosphate aqueous solution applies in the nickel electroless plating and plates during about five through twenty minutes by adjusting pH range (4 through 8 pH) and temperature (50° C. through 80° C.). In this case, the seed electrode layer 13 forms in an inner part of the through-holes 11d. An additional plating process and a dry process less than 100° C. may be performed depending on requirement of a user.

Figure 4F:
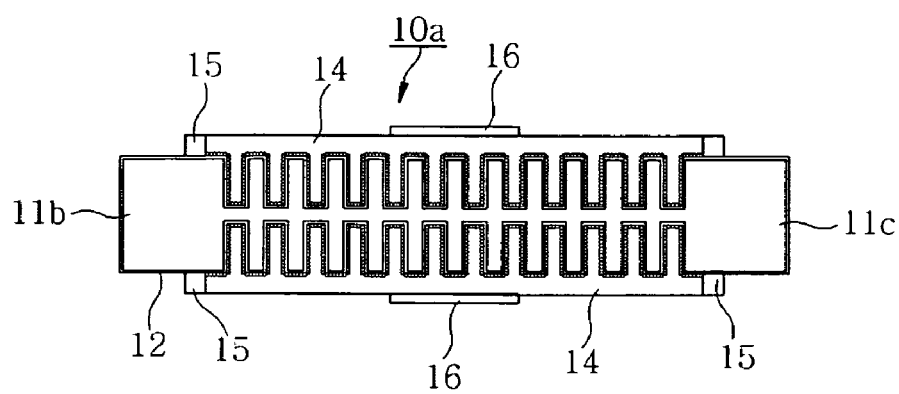

As shown in FIG. 4F, when the plurality of seed electrode layers 13 is formed, the manufacturing method forms the plurality of main electrode layers 14 to fill in the plurality of grooves 11d formed in the groove forming portion 11a of the terminal increase-type metal member 11 by using the plurality of seed electrode layers 13 as media, by using the electroless plating or the electroplating.

In the electroplating for forming the main electrode layer 14, the electroplating method adjusts pH range (1 through 5 pH) and temperature (30° C. through 70° C.) and applies DC (Direct Current) with current density of 20 through 120 mA/cm$^2$ in sulfuric acid nickel aqueous solution or nickel chloride aqueous solution.

In the electroless plating for forming the main electrode layer 14, the electroless plating method adjusts pH range (5 through 7 pH) and temperature (70° C. through 90° C.) and proceeds material having seed electrode layer 13 during about ten through thirty minutes and removes plating solution components of surface thereof by dipping and cleaning during one through thirty seconds at the normal temperature.

Figure 4G:
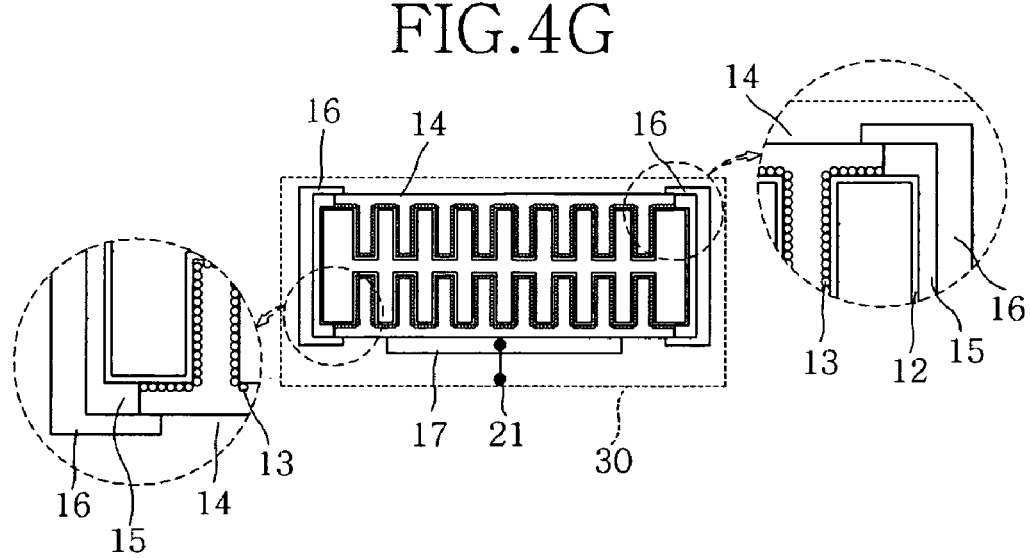

As shown in FIG. 4G, the manufacturing method forms a conductive connecting layer 16, connecting the plurality of main electrode layers 14, on the side 11e of terminal increase-type metal member 11 in a direction where the first and the second electrode withdrawing portions 11b and 11c of the terminal increase-type metal member 11 are orthogonal to each other.

As shown in FIG. 3, when the conductive connecting layer 16 is formed, the manufacturing method connects the second lead terminal 22 to the main electrode layers 14 of the terminal increase-type metal member 11 and selectively connects the first lead terminal 21 to the first and the second electrode withdrawing portions 11b and 11c. For example, when constructing the polar metal capacitor by selectively connecting the second lead terminal 22 to the first and the second electrode withdrawing portions 11b and 11c, it is possible to construct the metal capacitor to have three terminals. Also, when constructing the non-polar metal capacitor, it is possible to construct the metal capacitor to have two terminals.

Between the forming of the conductive connecting layer 16 and the connecting of the first and the second lead terminals 21 and 22, the manufacturing method forms the conductive adhesive layer 17 on the main electrode layer 14 connected to the second lead terminal 22 in order to improve the adhesiveness of the first and the second lead terminals 21 and 22. The conductive adhesive layer 17 is formed by using any one of a method of spraying metal adhesives or solder paste, the electroplating, and the electroless plating.

As shown in FIG. 3, when the first and the second lead terminals 21 and 22 are connected, the manufacturing method seals the metal member 11 with the sealing member 30 so that the first and the second lead terminals 21 and 22 may be externally exposed. When sealing the terminal increase-type metal member 11 with the sealing member 30, the metal terminal increase-type member 11 is sealed using molding material or a cover member with an empty inside.

Embodiment 2

Figure 5:
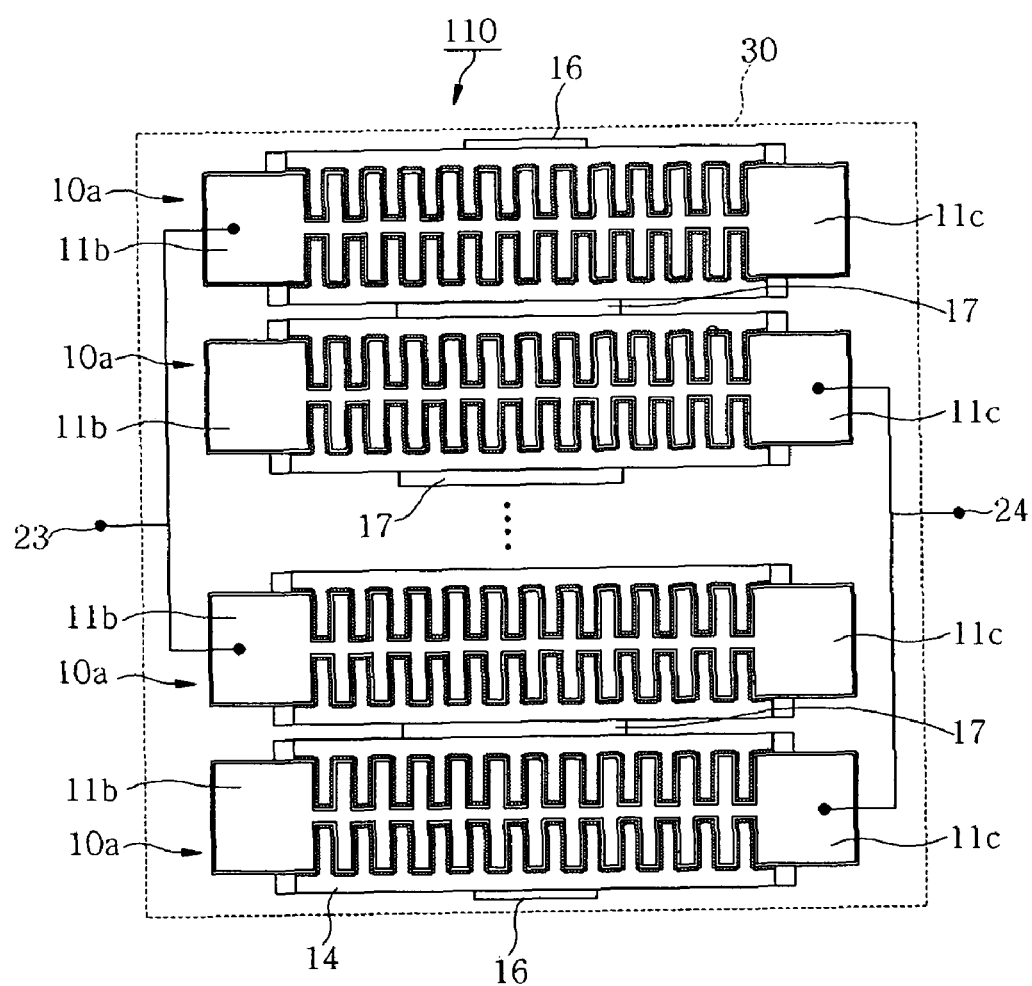
FIG. 5 is a cross-sectional view of a metal capacitor according to a second embodiment of the present invention.

As shown in FIG. 5, the metal capacitor 110 according to the second embodiment of the present invention includes a plurality of non-through type metal members 10a, a conductive adhesive layer 17, a third lead terminal 23, a fourth lead terminal 24, and a sealing member 30. Hereinafter, the configuration thereof will be sequentially described.

Each of the plurality of non-through type metal members 10a includes the terminal increase-type metal member 11, the metal oxide layer 12, the plurality of seed electrode layers 13, the plurality of main electrode layers 14, the insulating layer 15, and the conductive connecting layer 16. However, the seed electrode layers 13 may be removed and not be applied depending on requirement of the user.

The configuration thereof has been described above when describing the metal capacitor 10, and thus further detailed descriptions will be omitted here. The plurality of non-through type metal members 10a is sequentially disposed. The conductive adhesive layer 17 is disposed between the main electrode layers 14 of the plurality of non-through type metal members 10a and thereby adheres the plurality of non-through type metal members 10a.

The third lead terminal 23 is connected to the first electrode withdrawing portions 11b of the non-through type metal members 11 that are located in odd numberth locations among the plurality of disposed non-through type metal members 10a. Specifically, as shown in FIG. 4, when it is assumed that, among the plurality of disposed non-through type metal members 10a, an uppermost located non-through type metal member 10 is a first non-through type metal member 10a and a non-through type metal member 10 located therebelow is a second non-through type metal member 10a, the third terminal 23 is connected to the first electrode withdrawing portions 11b of the non-through type metal members 10a located in the odd number$^{th}$ locations such as the first or the third location. Conversely, the fourth terminal 24 is connected to the second electrode withdrawing portions 11c of non-through type metal members 10a that are located in even number$^{th}$ locations among the plurality of disposed non-through type metal members. Through this, the non-polar metal capacitor 110 is constructed. Specifically, the third and the fourth lead terminals 23 and 24 are connected to the first and the second electrode withdrawing portions 11b and 11c of the terminal increase-type metal member 11 formed with the metal oxide layer having the same polarity. Accordingly, the metal capacitor 110 is constructed to have the non-polarity.

The sealing member 30 seals the plurality of non-through type metal members 10a, connected with the third and the fourth lead terminals 23 and 24, so that the third and the fourth lead terminals 23 and 24 may be externally exposed. Through this, the non-polar metal capacitor 110 is constructed to thereby protect the plurality of internally disposed non-through type metal members 10a.

Embodiment 3

Figure 6:
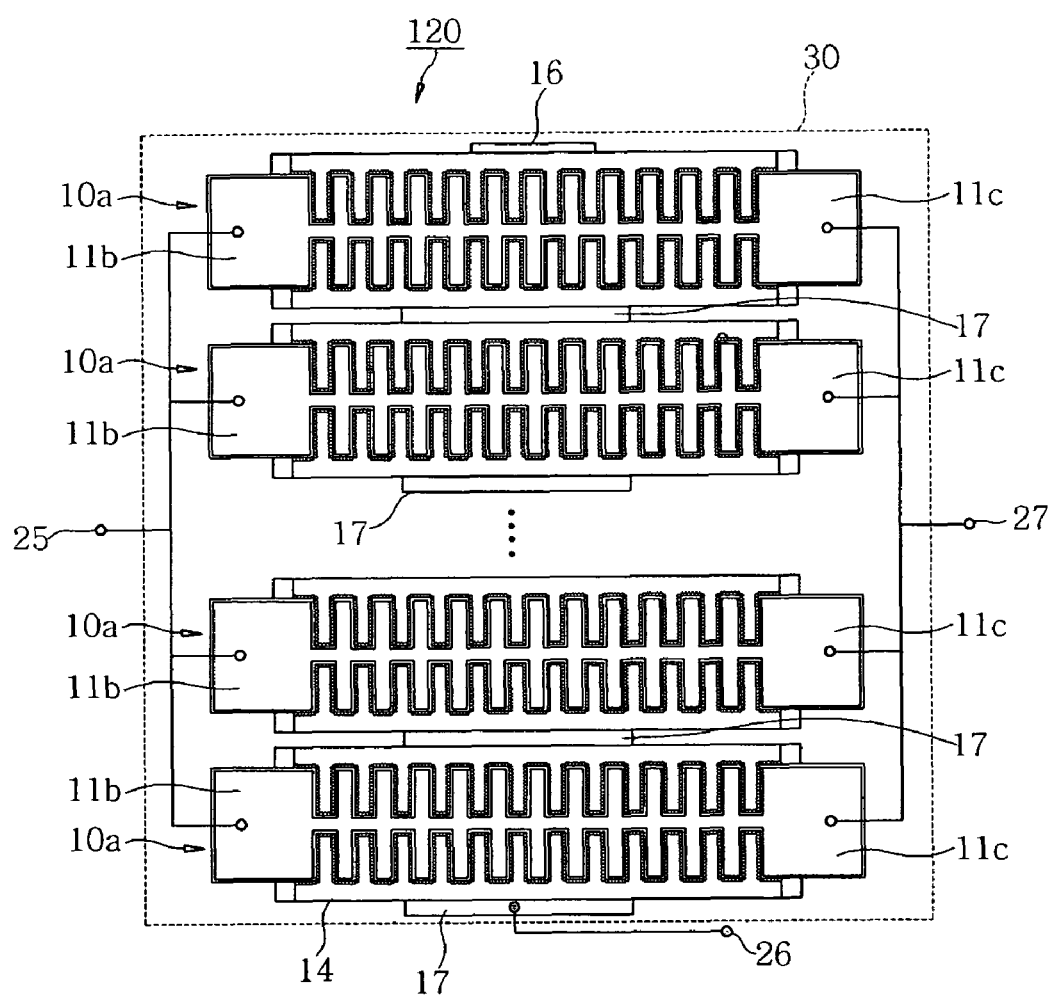
FIG. 6 is a cross-sectional view of a metal capacitor according to a third embodiment of the present invention.

As shown in FIG. 6, the meal capacitor 120 according to the third embodiment of the present invention includes a plurality of non-through type metal members 10a, a conductive adhesive layer 17, a first polar lead terminal 25, a second polar lead terminal 26, and a third polar lead terminal 27. Hereinafter, the configuration thereof will be sequentially described.

Each of the plurality of non-through type metal members 10a includes the terminal increase-type metal member 11, the metal oxide layer 12, the plurality of seed electrode layers 13, the plurality of main electrode layers 14, the insulating layer 15, and the conductive connecting layer 16. The configuration thereof has been described above when describing the metal capacitor 10, and thus further detailed descriptions will be omitted here. The plurality of non-through type metal members 10a is sequentially disposed. The conductive adhesive layer 17 is disposed between the main electrode layers 14 of the plurality of non-through type metal members 10a and thereby adheres the plurality of non-through type metal members 10a.

The first polar lead terminal 25 is connected to the first electrode withdrawing portions 11b of the plurality of disposed non-through type metal members 10a and the second lead terminal 26 is connected to one of the main electrode layers 14 of the plurality of non-through type metal members 10. Specifically, the second polar lead terminal 26 is connected to the lowest located main electrode layer 14 among the plurality of main electrode layers 14 of the plurality of non-through type metal members 10a as shown in FIG. 6. In order to improve the adhesiveness of the second lead terminal 26 connected to the main electrode layer 14a, the conductive adhesive layer 17 is formed on one of the main electrode layers 14 of the plurality of non-through type metal members 10a.

The third polar lead terminal 27 may be connected to the second electrode withdrawing portions 11c of the plurality of non-through type metal members 10 and thereby construct the metal capacitor 120 as three terminals. Among the first through third polar lead terminals consisting of three terminals, the first and the third lead terminals 25 and 27 are connected to the first and the second electrode withdrawing portions 11b and 11c of the terminal increase-type metal member 12 to function as a positive electrode, and thus are used as an anode electrode. The second polar lead terminal 26 is connected to the main electrode layer 14 where the metal oxide layer 12 is not formed, to function as a negative electrode, and thus is used as a cathode node. Through this, the metal capacitor is constructed to have a polarity.

The terminal increase-type metal member 11 including the first and the second electrode withdrawing portions 11b and 11c may be applicable to function as the negative electrode. When the terminal increase-type metal member 11 functions as the negative electrode, the main electrode layer 14 functions as the positive electrode. Accordingly, when the second polar lead terminal 26 is applied to the cathode electrode, the first and the third polar lead terminal 25 and 27 are applied to the anode electrode. Conversely, when the second polar lead terminal 26 is applied to the anode electrode, the first and the third polar lead terminal 25 and 27 are applied to the cathode electrode. Also, when the first and the third polar lead terminal 25 and 27 are applied to the cathode electrode, the second polar lead terminal 26 is applied to the anode electrode. Conversely, when the first and the third polar lead terminal 25 and 27 are applied to the anode electrode, the second polar lead terminal 26 is applied to the cathode electrode.

The sealing member 30 seals the plurality of non-through type metal members 10a, connected with the first through third polar lead terminals 25, 26, and 27, so that the first through third polar lead terminals 25, 26, and 27 may be externally exposed. Through this, it is possible to protect the plurality of internally disposed non-through type metal members 110.

As described above, since a non-through type metal capacitor according to the present invention uses a metal material, high voltage is enabled and also it is possible to improve the safety for thermal resistance and environmental influence. Accordingly, since it is not necessary to form a negative pole, the capacitor may be manufactured in slim. Also, since interlayer contact resistance does not occur, the impedance characteristic may be improved.

According to the present invention, it is possible to improve an electric conductivity by about 10,000 to 1,000,000 folds by applying a metal material for an electrolyte, in comparison to when using a conventional electrolyte or an organic semiconductor. Also, since the serial multi-laying is possible, high-voltage is enabled. Also, a relatively higher electrical safety is provided. It is possible to improve a miniature, a low equivalent series resistance (ESR), a reduction in a ripple pyrexia, a long life, a heat-resistant stability, non-fuming, non-firing, and environment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A metal capacitor comprising:
a plurality of non-through type metal members, each comprising: a terminal increase-type metal member comprising a groove forming portion where a plurality of grooves is arranged, and first and second electrode withdrawing portions being formed on the groove forming portion; a metal oxide layer being formed on the terminal increase-type metal member; an insulating layer being formed on the plurality of main electrode layer and/or the terminal increase-type metal member to externally expose the first and the second electrode withdrawing portions of the terminal increase-type metal member; a plurality of seed electrode layers, each seed electrode layer being formed on the metal oxide layer formed on the groove forming portion of the metal oxide; a plurality of main electrode layers being formed on the plurality of seed electrode layers formed in the groove forming portion to fill in the plurality of grooves formed on the groove forming portion terminal increase-type of the metal member; and a plurality of conductive connecting layers being formed on the plurality of main electrode layers and the insulating layer to make the first and the second electrode withdrawing portions of the metal member orthogonal to each other and connect the plurality of main electrode layers, wherein the plurality of non-through type metal members are sequentially disposed;
a conductive adhesive layer being interposed between the main electrode layers of the plurality of non-through type metal members to adhere the plurality of non-through type metal members;
a first polar lead terminal being connected to the first electrode withdrawing portions of the plurality of non-through type metal members;
a second polar lead terminal being connected to one of the main electrode layers of the plurality of non-through type metal members;
a third polar lead terminal being connected to the second electrode withdrawing portions of the plurality of non-through type metal members; and
a sealing member sealing the plurality of non-through type metal members connected to the first through the third polar lead terminals to externally expose the first through the polar lead terminals.

2. The metal capacitor of claim 1, wherein the first and the third polar lead terminals are applied to an anode electrode when the second polar lead terminal is applied to a cathode electrode, and the first and the third polar lead terminal are applied to the cathode electrode when the second polar lead terminal is applied to the anode electrode.

3. The metal capacitor of claim 1, wherein the second polar lead terminal is applied to an anode electrode when the first and the third polar lead terminals are applied to a cathode electrode, and the second polar lead terminal is applied to the cathode electrode when the first and the third polar lead terminals are applied to the anode electrode.

4. The metal capacitor of claim 1, wherein one of the main electrode layers of the plurality of non-through type metal members connected to the second polar lead terminal further comprises a conductive adhesive layer.

* * * * *